United States Patent
Niwa et al.

(10) Patent No.: US 6,864,307 B2
(45) Date of Patent: Mar. 8, 2005

(54) SLIDING MATERIAL

(75) Inventors: Takahiro Niwa, Nagoya (JP); Hideki Iwata, Nagoya (JP); Nobutaka Hiramatsu, Nagoya (JP); Takayuki Shibayama, Nagoya (JP)

(73) Assignee: Daido Metal Company Ltd., Nagoya (JP)

( * ) Notice: Subject to any disclaimer, the term of this patent is extended or adjusted under 35 U.S.C. 154(b) by 471 days.

(21) Appl. No.: 09/915,568

(22) Filed: Jul. 27, 2001

(65) Prior Publication Data

US 2002/0037992 A1 Mar. 28, 2002

(30) Foreign Application Priority Data

Aug. 7, 2000 (JP) ........................................ 2000-238412

(51) Int. Cl.⁷ ................................................. C08K 3/08
(52) U.S. Cl. ...................................... 524/440; 524/439
(58) Field of Search ................................. 524/439, 440

(56) References Cited

U.S. PATENT DOCUMENTS 5,024,881 A    6/1991   Matucha et al.
5,024,882 A    6/1991   Matucha et al.

FOREIGN PATENT DOCUMENTS

JP    B-39(1964)-16950    6/2001

OTHER PUBLICATIONS

Abstract of JP 61261396, "Sliding Material having Excellent Frictional Properties", Applicant: Daido Metal Co Ltd., Inventor Mori Sanae, May 16, 1985.

*Primary Examiner*—Edward J. Cain
(74) *Attorney, Agent, or Firm*—Browdy and Neimark, P.L.L.C.

(57) ABSTRACT

Bush 1 comprises back metal layer 2 made from a steel plate and porous sintered metal layer 4 made from copper, provided on the surface of back metal layer 2 through copper plating layer 3 and impregnated and coated with sliding material 5 within and on the surface of porous sintered metal layer 4, where sliding material 5 comprises PTFE as the main component (not less than 50 vol. % of the entire material), 3–40 vol. % of Bi particles and/or Bi alloy particles, 1–40 vol. % of injection moldable fluororesin such as PFA, etc., 0.1–20 vol. % of hard particles such a W, $Al_2O_3$, etc., and 0.1–20 vol. % of a solid lubricant such as graphite, etc. The sliding material based on PTFE as the main component is free from lead and can further improve the wear resistance, while maintaining good sliding characteristics.

6 Claims, 1 Drawing Sheet

SLIDING MATERIAL

BACKGROUND OF THE INVENTION

The present invention relates to a lead(Pb)-free sliding material comprising polytetrafluoroethylene resin as the main components for use, for example, as a plain bearing material.

Now available are such plain bearing materials with a porous bronze layer on the surface side of steel back metal, in which the porous bronze layer is impregnated with a sliding material comprising a synthetic resin as the main component. Sliding materials comprising polytetrafluoroethylene resin (which will be hereinafter referred to as "PTFE"), which contains about 20 vol. % of lead (Pb) particles, are known as sliding materials of such a kind (as disclosed in e.g. JP-B-39(1964)-16950). Such sliding materials are distinguished in the sliding characteristics, because a low coefficient of friction can be obtained by the inclusion of Pb particles.

However, sliding materials free from Pb have been keenly desired from the viewpoint of the recent environmental or ecological problems, even if the sliding materials are those comprising PTFE as the main component, as mentioned above. The present inventor has already invented sliding materials containing bismuth (Bi) particles or bismuth alloy particles in place of the conventional Pb and has filed a patent application (Japanese Patent Application No. 2000-26671), where Bi can effectively work as a substitute for Pb particularly to show a catalytic action to form a PTFE coating film (as transferred onto the surface of a counterpart material in the same manner as Pb), and thus stable sliding characteristics can be obtained. However, even such sliding materials comprising Bi or Bi alloy-containing PTFE as mentioned above still have a room for improvement as to the wear resistance. That is, further improvement of wear resistance has been still now keenly desired.

SUMMARY OF THE INVENTION

The present invention has been accomplished in view of the aforementioned situations, and an object of the present invention is to provide a lead (Pb)-free sliding material comprising polytetrafluoroethylene resin as the main component, capable of further improving the wear resistance while maintaining good sliding characteristics.

Sliding materials, which comprise PTFE as the main component (its content: not less than 50 vol. %) and further contain at least one member selected from the group consisting of Bi particles and Bi alloy particles (which may be hereinafter referred to as "Bi particles and/or Bi alloy particles"), where Bi particles and/or Bi alloy particles can show a catalytic action to form a PTFE transferred film (coating film) on the surface of a counterpart material, thereby the sliding materials stable in the sliding characteristics, even if they contain no such Pb, and also making them environmentally or ecologically friendly. In that case, better sliding characteristics can be obtained by making a mixing proportion of Bi particles and/or Bi alloy particles 3–40 vol. %. More preferable is 10–30 vol. %. Besides single Bi particles, alloys of Bi with silver, tin, zinc, indium or the like can be used. Content of these alloying metals is desirably 0.5–30 mass %. Particle sizes of Bi particles and/or Bi alloy particles are desirably about 1 to about 50 μm.

As a result of further extensive studies and tests, the present inventor has found that the wear resistance can be much more improved by further addition of such components, as will be described below, to a sliding material comprising PTFE as the main component and Bi particles and/or Bi alloy particles, and has accomplished the present invention.

That is, the present sliding material is characterized by comprising not less than 50 vol. % of polytetrafluoroethylene resin, 3–40 vol. % of at least one member selected from the group consisting of bismuth particles and bismuth alloy particles, and 1–40 vol. % of injection moldable fluororesin, sum total being 100 vol. % (first aspect of the present invention).

DETAILED DESCRIPTION OF THE INVENTION

Figure 1:
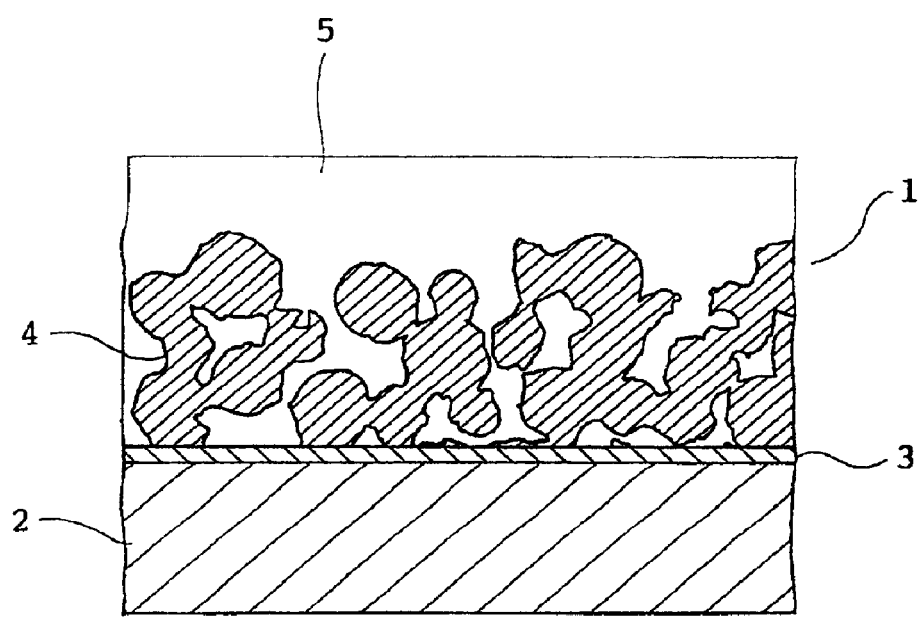
FIG. 1 is a schematic enlarged vertical cross-sectional view of a bush structure according to one embodiment of the present invention, where reference numeral 1 shows a bush (plain bearing), 2 a back metal layer, 4 a porous sintered metal layer and 5 a sliding material.

In the first aspect of the present invention, the wear resistance can be further improved by mixing of an injection moldable fluororesin, and also the coefficient of friction can be made lower and the strength of the sliding material can be improved thereby at the same time. When the mixing proportion of the injection moldable fluororesin is less than 1 vol. %, any satisfactory effect cannot be obtained on the improvement of wear resistance, whereas above 40 vol. % the coefficient of friction will be deteriorated. As preferable mixing proportion is 2–20 vol. %. The injection moldable fluororesin for use in the present invention includes, for example, tetrafluoroethylene-perfluoroalkyl vinyl ether copolymer (which will be hereinafter referred to as "PFA"), tetrafluoroethylene-hexafluoropropylene copolymer (which will be hereinafter referred to as "FEP"), polyvinylidene fluoride (which will be hereinafter referred to as "PVDF"), etc.

The present siliding material is further characterized by comprising not less than 50 vol. % of polytetrafluoroethylene resin, 3–40 vol. % of at least one member selected from the group consisting of bismuth particles and bismuth alloy particles, and 0.1–20 vol. % of hard particles, sum total being 100 vol. % (second aspect of the present invention).

In the second aspect of the present invention, mixed particles of higher hardness, i.e. hard particles, can be distributed over the sliding surface, thereby largely improving the wear resistance. In that case, when the mixing proportion of the hard particles is less than 0.1 vol. %, any effect cannot be obtained on the improvement of wear resistance, whereas above 20 vol. % the coefficient of friction will be deteriorated. A preferable mixing proportion is 0.5–10 vol. %. The hard particles for use in the present invention include, for examples, particles of hard metals such as W, Ti, Cr, etc. and particles of ceramics such as $Al_2O_3$, $Fe_3O_4$, $CrO_2$, SiC, $TiO_2$, etc. Average particle size of the hard particles is not more than 10 μm, preferably not more than 1 μm.

The present sliding material is further characterized by comprising not less than 50 vol. % of polytetrafluoroethylene resin, 3–40 vol. % of at least one member selected from the group consisting of bismuth particles and bismuth alloy particles, and 0.1–20 vol. % of a solid lubricant, sum total being 100 vol. % (third aspect of the present invention).

In the third aspect of the present invention, not only the self-lubricability can be increased, but also the wear resistance and the coefficient of friction can be improved by mixing of the solid lubricant. In that case, when the mixing proportion of the solid lubricant is less than 0.1 vol. %, any satisfactory effect cannot be obtained on the improvement of the coefficient of friction, whereas above 20 vol. % the wear resistance will be deteriorated. A preferable mixing proportion is 0.5–10 vol. %. The solid lubricant for use in the present invention includes, for example, graphite (which will be hereinafter referred to as "Gr"), $MoS_2$, $WS_2$, BN, etc.

The present sliding material is further characterized by comprising not less than 50 vol. % of polytetrafluoroethylene resin, 3–40 vol. % of at least one member selected from the group consisting of bismuth particles and bismuth alloy particles, 1–40 vol. % of injection moldable fluororesin, and 0.1–20 vol. % of hard particles, sum total being 100 vol. % (fourth aspect of the present invention).

In the fourth aspect of the present invention, the wear resistance, the coefficient of friction, and the strength of the sliding material can be improved by mixing of the injection moldable fluororesin, and the wear resistance can be much more improved by mixing of the hard particles.

The present sliding material is further characterized by comprising not less than 50 vol. % of polytetrafluoroethylene resin, 3–40 vol. % of at least one member selected from the group consisting of bismuth particles and bismuth alloy particles, 1–40 vol. % of injection moldable fluororesin, and 0.1–20 vol. % of a solid lubricant, sum total being 100 vol. % (fifth aspect of the present invention).

In the fifth aspect of the present invention, the wear resistance, the coefficient of friction and the strength of the sliding material can be improved by mixing of injection moldable fluororesin, and the coefficient of friction and the wear resistance can be much more improved by mixing of the solid lubricant.

The present sliding material is further characterized by comprising not less than 50 vol. % of polytetrafluoroethylene resin, 3–40 vol. % of at least one member selected from the group consisting of bismuth particles and bismuth alloy particles, 1–40 vol. % of injection moldable fluororesin, 0.1–20 vol. % of hard particles and 0.1–20 vol. % of a solid lubricant, sum total being 100 vol. % (sixth aspect of the present invention).

In the sixth aspect of the present invention, the wear resistance, the coefficient of friction, and the strength of the sliding material can be improved by mixing of the injection moldable fluororesin and the coefficient of friction and the wear resistance can be much more improved by mixing of both hard particles and solid lubricant.

DESCRIPTION OF PREFERRED EMBODIMENTS

The present invention will be described below in the case of using the present sliding material as a plain bearing (bush) material, referring to the drawings.

FIG. 1 schematically shows a cross-sectional structure of bush 1 for use in an oil-less (dry) state i.e. without using any lubricating oil. Bush 1 comprises a back metal layer 2 made from a metallic steel plate (low carbon steel for general structural purposes), porous sintered metal layer 4 made of a copper alloy provided on the surface side (inner peripheral side) of back metal layer 2 through copper plating layer 3 for increasing the bondability, and sliding material 5 of the present invention (whose modes of embodiments will be described in the following sections) provided within and on the surface of porous sintered metal layer 4. In FIG. 1 no hatching is made as to sliding material 5 for mere drawing simplicity. Bush 1 is to hold a shaft made from a steel material.

Sliding material 5 has any one of compositions typically shown in Examples 1 to 7 in the following Table 1, which comprise PTFE as the main component (content: not less than 50 vol. %), 10–20 vol. % of Bi particles or Bi alloy particles, and PFA as an injection moldable fluororesin, Gr as a solid lubricant and W or $Al_2O_3$ as hard particles, where the hard particles have an average particle size of 1 μm and the solid lubricant has an average particle size of 10 μm. Sliding material for use in Comparative Examples 1 to 7 in the following Table 1 comprise PTFE as the main component and 5–38 vol. % of Bi particles or Bi alloy particles as disclosed in Japanese Patent Application No. 2000-26671.

Procedure for producing bush 1 will be briefly described below: at first, copper alloy powders are scattered to a thickness of 0.3 mm onto a 1.2 mm-thick steel plate (back metal layer 2) provided with copper plating layer 3 on the surface, followed by heating to a temperature of 750°–900° C. in a reductive atmosphere to sinter the copper alloy powders. Porous sintered metal layer 4 is thus formed on back metal layer 2 (copper plating layer 3).

On the other hand, a mixture of materials for forming sliding material 5 is prepared by mixing a predetermined amount of PTFE with a predetermined amount of Bi particles or Bi alloy particles and further with a predetermined amount of PFA powders, hard particles and/or a finely particulate solid lubricant, followed by uniform blending to obtain a mixture.

Then, porous sintered metal layer 4 on said back metal layer 2 is impregnated and coated with the mixture so obtained, followed by sintering at a temperature of 350°–400° C. and rolling to obtain a uniform thickness. Flat plate materials comprising back metal layer 2 and porous sintered metal layer 4 provided said back metal layer 2 and impregnated and coated with sliding material 5 can be obtained thereby. Then, the flat plate materials are cut to desired dimensions and subjected to forming work (wrapping work) to form cylindrical bushes 1. Bushes 1 so formed are each to hold a shaft on the inner peripheral sliding surface (surface of sliding material 5).

To test and confirm the effectiveness of said sliding materials 5, sliding materials of compositions of Examples 1 to 7 and those of compositions of Comparative Examples 1 to 7 were subjected to wear and friction tests. Tests were carried out by using test pieces, 20 mm in inner diameter×20 mm wide×1.5 mm thick, without lubrication for 100 hours under such conditions as a load: 5 MPa and a speed: 6 m/min. Test results are shown in the following Table 2.

TABLE 1

| | Composition (vol. %) |
|---|---|
| Comp. Ex. 1 | PTFE + 5% Bi |
| Comp. Ex. 2 | PTFE + 10% Bi |
| Comp. Ex. 3 | PTFE + 20% Bi |
| Comp. Ex. 4 | PTFE + 30% Bi |
| Comp. Ex. 5 | PTFE + 38% Bi |
| Comp. Ex. 6 | PTFE + 20% (Bi-10 mass % Ag) |
| Comp. Ex. 7 | PTFE + 20% (Bi-10 mass % Sn) |
| Example 1 | PTFE + 5% PFA + 15% Bi |
| Example 2 | PTFE + 15% Bi + 5% Gr |
| Example 3 | PTFE + 10% Bi + 10% W |
| Example 4 | PTFE + 15% Bi + 5% $Al_2O_3$ |
| Example 5 | PTFE + 20% (Bi-10 mass % Sn) + 2.5% $Al_2O_3$ |

TABLE 1-continued

| | Composition (vol. %) |
|---|---|
| Example 6 | PTFE + 2% PFA + 20% (Bi-10 mass % Ag) + 5% W |
| Example 7 | PTFE + 5% PFA + 15% Bi + 7.5% Al$_2$O$_3$ + 2.5 Gr |

TABLE 2

| | Coefficient of friction | Amount of wear ($\mu$m) | Transferred film |
|---|---|---|---|
| Comp. Ex. 1 | 0.16 | 30 | Found |
| Comp. Ex. 2 | 0.14 | 26 | Found |
| Comp. Ex. 3 | 0.12 | 25 | Found |
| Comp. Ex. 4 | 0.13 | 26 | Found |
| Comp. Ex. 5 | 0.15 | 28 | Found |
| Comp. Ex. 6 | 0.12 | 20 | Found |
| Comp. Ex. 7 | 0.15 | 21 | Found |
| Example 1 | 0.12 | 19 | Found |
| Example 2 | 0.10 | 20 | Found |
| Example 3 | 0.14 | 16 | Found |
| Example 4 | 0.13 | 15 | Found |
| Example 5 | 0.14 | 14 | Found |
| Example 6 | 0.13 | 12 | Found |
| Example 7 | 0.12 | 03 | Found |

As is obvious from the foregoing test results, sliding materials of Examples 1 to 7 had equivalent or superior coefficients of friction to those of Comparative Examples 1 to 7, and also had sufficiently lower amount of wear. Particularly, Example 6 based on the mixing of PFA as an injection moldable fluororesin and W as hard particles showed a considerably reduced amount of wear. Example 7 based on the mixing of both hard particles and solid lubricant also showed a considerably reduced amount of wear. After the tests, the surfaces of counterpart shafts were inspected and it was found that transferred films of PTFE were found. Examples 5 and 6 using Bi alloy with 10 mass % of Sn or Ag in place of single Bi showed lower amount of wear.

As described above, sliding materials 5 of compositions of the present invention, different from the conventional sliding materials, can have a distinguished effect on further improvement of wear resistance, while maintaining good sliding characteristics by adding PFA as an injection moldable fluororesin, W or Al$_2$O$_3$ as hard particles and Gr as a solid lubricant to sliding materials comprising PTFE as the main component and Bi particles and/or Bi alloy particles in place of lead.

In the foregoing embodiments, the present sliding materials are applied to bush 1 for holding a shaft, but can be applied to sliding members in various uses, where the sliding members are not limited to bushes, but include thrust washers, slide plates, etc. The present sliding materials can be used not only in the lubrication-free circumstance, but also in liquids such as a lubricating oil, water, etc.

The present invention is not limited to the foregoing embodiments. For example, FEP, PVDF, etc. can be used as an injection moldable fluororesin; particles of hard metals such as Ti, Cr, etc. or ceramics such as Fe$_3$O$_4$, CrO$_2$, SiC, TiO$_2$, etc. can be used alone or in mixture of a plurality thereof as hard particles; and MoS$_2$, WS$_2$, BN, etc. can be likewise used as a solid lubricant. Furthermore, materials of back metal layer and porous metal layer and counterpart (shaft) are not limited to those as mentioned above.

While we have shown and described several embodiments in accordance with our invention, it should be understood the disclosed embodiments are susceptible of changes and modifications without departing from the scope of the invention. Therefore, we do not intend to be bound by the details shown and described herein but intend to cover all such changes and modifications as falling within the ambit of the appended claims.

What is claimed is:

1. A sliding material which comprises:
   a. not less than 50 vol. % of polytetrafluoroethylene resin;
   b. 3–40 vol. % of at least one member selected from the group consisting of bismuth particles and bismuth alloy particles, and
   c. 0.5–10 vol. % of a solid lubricant, wherein the solid lubricant is selected from the group consisting of at least one of graphite, MoS$_2$, WS$_2$ and BN;
   d. the sum total being 100 vol. %; said sliding material being substantially free of lead.

2. The sliding material of claim 1 wherein said polytetrafluoroethylene resin is present in an amount of at least 70 vol. %, and
   said bismuth particles or bismuth alloy particles are present in an amount of 10–30 vol. % and are of particle size of about 1 to about 50 $\mu$m.

3. A sliding material which comprises:
   a. not less than 50 vol. % of polytetrafluoroethylene resin;
   b. 3–40 vol. % of at least one member selected from the group consisting of bismuth particles and bismuth alloy particles;
   c. 2–20 vol. % of injection moldable fluororesin selected from the group consisting of tetrafluoroethylene-perfluoroalkyl vinyl ether copolymer, tetrafluoroethylene-hexafluoropropylene copolymer and polyvinylidene fluoride;
   d. 0.5–10 vol. % of a solid lubricant selected from the group consisting of at least one of graphite, MoS$_2$, WS$_2$ and BN;
   e. the sum total being 100 vol. %;
   f. said sliding material being substantially free of lead.

4. The sliding material of claim 3 wherein said polytetrafluoroethylene resin is present in an amount of at least 70 vol. %, and
   said bismuth particles or bismuth alloy particles are present in an amount of 10–30 vol. % and are of particle size of about 1 to about 50 $\mu$m.

5. A sliding material comprising:
   a. not less than 50 vol. % of polytetrafluoroethylene resin;
   b. 3–40 vol. % of at least one member selected from the group consisting of bismuth particles and bismuth alloy particles;
   c. 2–20 vol. % of injection moldable fluororesin selected from the group consisting of tetrafluoroethylene-perfluoroalkyl vinyl ether copolymer, tetrafluoroethylene-hexafluoropropylene copolymer, and polyvinylidene fluoride;
   d. 0.5–10 vol. % of hard particles selected from the group consisting of at least one of W, Ti, Cr, Al$_2$O$_3$, Fe$_3$O$_4$, CrO$_2$, SiC and TiO$_2$, and said hard particles have an average particle size not more than 10 microns; and
   e. 0.5–10 vol. % of a solid lubricant selected from the group consisting of at least one of graphite, MoS$_2$, WS$_2$ and BN;
   f. the sum total being 100 vol. %, and said sliding material being substantially free of lead.

6. The sliding material of claim 5 wherein said polytetrafluoroethylene resin is present in an amount of at least 70 vol. %, and
   said bismuth particles or bismuth alloy particles are present in an amount of 10–30 vol. % and are of particle size of about 1 to about 50 $\mu$m.

* * * * *